US008635234B2

(12) United States Patent
Andersen

(10) Patent No.: US 8,635,234 B2
(45) Date of Patent: *Jan. 21, 2014

(54) MULTI-LEVEL MULTIPLEXOR SYSTEM FOR NETWORKED BROWSER

(75) Inventor: Benjamin H. Andersen, Golden Valley, MN (US)

(73) Assignee: Destaze Tok Group, LLC, Wilmington, DE (US)

(*) Notice: Subject to any disclaimer, the term of this patent is extended or adjusted under 35 U.S.C. 154(b) by 3036 days.

This patent is subject to a terminal disclaimer.

(21) Appl. No.: 11/141,269

(22) Filed: May 31, 2005

(65) Prior Publication Data
US 2006/0007875 A1    Jan. 12, 2006

Related U.S. Application Data

(63) Continuation of application No. 09/863,095, filed on May 22, 2001, now Pat. No. 6,912,532.

(60) Provisional application No. 60/206,440, filed on May 22, 2000.

(51) Int. Cl.
G06F 7/00 (2006.01)
G06F 17/30 (2006.01)

(52) U.S. Cl.
CPC ................................. *G06F 17/3089* (2013.01)
USPC ........................................................ 707/758

(58) Field of Classification Search
None
See application file for complete search history.

(56) References Cited

U.S. PATENT DOCUMENTS

| | | |
|---|---|---|
| 5,544,354 A | 8/1996 | May et al. |
| 5,710,918 A | 1/1998 | Lagarde et al. |
| 5,774,670 A | 6/1998 | Montulli |
| 5,835,092 A | 11/1998 | Boudreau et al. |
| 5,855,015 A | 12/1998 | Shoham |
| 5,864,845 A | 1/1999 | Voorhees et al. |
| 5,873,076 A | 2/1999 | Barr et al. |
| 5,873,080 A | 2/1999 | Coden et al. |

(Continued)

OTHER PUBLICATIONS

U.S. Appl. No. 60/172,038, filed Dec. 23, 1999.*

(Continued)

Primary Examiner — Jay Morrison

(57) ABSTRACT

A multi-level multiplexor system enables a networked browser client to access content information over a networked computer system, such as the Internet. The multi-level multiplexor system has at least one program executing on a server operably connected to the networked computer system that receives a service request from the networked browser client. In response, the program packages a reply that is returned to the networked browser client and causes that browser to automatically issue a plurality of service requests to sources of content information on the networked computer system. The packaged reply also causes the browser to present the responses to the plurality of service requests to sources of content information such that each response is selectively displayed as one of a cascaded series of pages of content information within a single window frame in the browser. In this way, the present invention is implemented as a thin-client solution with the advantages of minimizing network traffic while at the same time allow for increased speed of access to multiple sources of content information. The multi-level multiplexor system afford the user a simple, yet efficient mechanism to access to multiple sources of content information that retains the integrity of the content information without subjecting the user to the disadvantages of opening a new browser window for each new source of content information.

24 Claims, 14 Drawing Sheets

(56) References Cited

U.S. PATENT DOCUMENTS

| | | | |
|---|---|---|---|
| 5,877,766 A | 3/1999 | Bates et al. | |
| 5,918,239 A | 6/1999 | Allen et al. | |
| 5,974,409 A | 10/1999 | Sanu et al. | |
| 5,983,262 A | 11/1999 | Kukkal | |
| 5,987,466 A | 11/1999 | Greer et al. | |
| 6,012,055 A | 1/2000 | Campbell et al. | |
| 6,012,090 A | 1/2000 | Chung et al. | |
| 6,016,520 A | 1/2000 | Facq et al. | |
| 6,031,989 A | 2/2000 | Cordell | |
| 6,041,326 A | 3/2000 | Amro et al. | |
| 6,049,812 A | 4/2000 | Bertram et al. | |
| 6,052,716 A | 4/2000 | Gibson | |
| 6,177,936 B1 | 1/2001 | Cragun | |
| 6,397,264 B1 | 5/2002 | Stasnick et al. | |
| 6,590,592 B1 | 7/2003 | Nason et al. | |
| 6,636,853 B1 | 10/2003 | Stephens, Jr. | |
| 6,683,633 B2 | 1/2004 | Holtzblatt et al. | |
| 6,754,697 B1 | 6/2004 | Berstis | |
| 6,785,865 B1 | 8/2004 | Cote et al. | |
| 6,990,653 B1* | 1/2006 | Burd et al. | 717/108 |
| 2001/0043235 A1* | 11/2001 | Best et al. | 345/781 |

OTHER PUBLICATIONS

"SavvySearch: A Meta-Search Engine that Learns which Search Engines to Query", by Howe et al., AI Magazine, Year: 1997, Issue: 18, Jan. 28, 1997.*

Website Print-Out: yahoo.com, Yahoo Inc!, 5 pgs., Copyright 2000.

Website Print-Out: altavista.com, AltaVista Company, 7 pgs., Copyright 2000.

Website Print-Out: infoseek.com (as go.com), Inforseek Corporation, Copyright 1998-2000.

Website Print-Out: askjeeves.com, As Jeeves, Inc., 1 pg., Copyright 1996-2000.

Website Print-Out: google.com, Google Inc., 4 pgs., Copyright 2000.

Website Print-Out: dogpile.com, Go2Net, Inc., 9 pgs., Copyright 1996-2000.

Website Print-Out: chubba.com, whatUSeek, Corp., 1 pg., Copyright 2002.

Website Print-Out: metcrawler.com, InfoSpace, Inc., 2 pgs., Copyright 2002.

Website Print-Out: lib.Berkeley.edu/TeachingLib/Guides/Internet/FindInfo.html#Outline, Library, University of California, Berkeley, 4 pgs., Copyright 1997-2000.

Website Print-Out: cui.unige.ch/meta-idex.htm, CUI, 10 pgs., Copyright 2000.

Website Print-Out: searchenginewatch.com, Internet.com Corp., 3 pgs., Copyright 1996-2000.

Website Print-Out: gogettem.com, Coconut Island Software, Inc., 1 pg., Copyright 1997-2001.

Website Print-Out: totalnews.com, TotalNEWS Inc., 2 pgs., Copyright 1997-2000.

Website Print-Out: neoplanet.com, NeoPlanet, Inc., 8 pgs., Copyright 1998-2000.

Website Print-Out: centurionsoft.com, CenturionSoft, 7 pgs., Copyright 1999.

Website Print-Out: netcaptor.com, Stilesoft, Inc., 18 pgs., Copyright 1998-2000.

Website Print-Out: multisource.com, MultiSource, Inc., 2 pgs., Copyright 1996-2000.

Website Print-Out: visualmining.com, Visual Mining, Inc., 5 pgs., Copyright 1999-2000.

* cited by examiner

MULTI-LEVEL MULTIPLEXOR SYSTEM FOR NETWORKED BROWSER

RELATED APPLICATION

This application is a continuation of application Ser. No. 09/863,095 filed May 22, 2001 now U.S. Pat. No. 6,912,532, which claims the benefit of U.S. Provisional Application No. 60/206,440 filed May 22, 2000.

FIELD OF THE INVENTION

The present invention relates generally to the field of interfaces and techniques for accessing computerized networks, such as the Internet. More specifically, the present invention relates to a multi-level multiplexor system for a networked browser that increases the speed and efficiency with which a user can access information on a computerized network.

BACKGROUND OF THE INVENTION

The growth of the computerized networks such as the Internet has brought about an explosion in the amount of information available to users. One of the challenges with this wealth of information is how to find and access relevant information easily. Various search engines have been developed to meet this need, such as yahoo.com, altavista.com, infoseek.com, askjeeves.com and google.com. To search for information on the Internet, a user goes to the web site for one of the search engine and enters one or more words known as search terms. The search engine then uses the search terms to generate lists of web sites and/or web pages that best match the search terms. Various indexing and cataloging techniques can be used by the search engine to accomplish the search, such as list based searches, spider based searches or natural language based searches. More recently, meta search engines have been developed that allow a user to enter a single set of search terms at a web site and retrieve a single set of filtered results that are combined from matches found by multiple different primary search engines. Examples of these meta search engines include dogpile.com, chubba.com, thunderstone.com, ixquick.com and metacrawler.com. For a more detailed explanation how search engines work and a comparison of primary search engines and meta search engines, refer to lib.berkeley.edu/TeachingLib/Guides/Internet/FindInfo.html#Outline, cui.unige.ch/meta-index.html, and searchenginewatch.com. Examples of how search engines can be implemented and return combined results are described in U.S. Pat. Nos. 5,864,845, 5,873,080 and 5,974,409.

While meta search engines increase the available resources a user can review, the problem is how to present the results in a useable format. Most meta search engines filter the search results from different primary search engines and present these results according to a combined format unique to that meta search engine. This filtering process can be helpful in that relative rankings can be generated, duplicate results can be eliminated and the amount of information downloaded to the user is reduced, but it precludes a user from reviewing the original content of the results of the primary search engines. Some meta search engines, such as altaseek.com and 123seek.com, present their results by concatenating the first page of information returned from each primary search engine. In this way, a user can view the first page of the original information from each primary search engine by scrolling down through a single browser window containing the concatenated results. Unfortunately, when a large number of primary search engines are accessed, it is cumbersome to scroll through the large amount of downloaded information in a single browser window. In addition, when a user wants to access information from a particular primary search engine beyond the first page of original information, a new browser window is typically opened and the ability of the user to navigate by backtracking, for example, to previously viewed sites from the original browser window is not possible.

Other meta search engines, such as gogettem.com and searchspaniel.com present their results by opening up a new browser window for each of the different primary search engines. Although this format of presentation is sometimes more manageable than the concatenated scrolling format, the opening of a new browser window consumes additional computer resources of the user for each new browser that is opened and has the same problem of limiting the ability of the user to navigate by backtracking. When several primary search engines are accessed in this manner, the spontaneous spawning of new browser windows can be quite annoying as the user's cursor is constantly being redirected to the most recently opened window until all of the search results have been returned.

A variation on this theme is used by totalnews.com which also spawns a new browser window each time a user clicks on one of a series of buttons on the home page that identify and link to various third-party news web sites. Originally, the home page for totalnews.com used a framing approach in which the content of the selected third-party news web site corresponding to the button selected by the user was framed in the middle of the totalnews.com home page. To make the content information fit into this frame, the totalnews.com home page sometimes would strip off advertisements and other content from the third-party new web site. Ultimately, copyright and source confusion claims by some of the third-party news web sites forced totalnews.com to abandon this framing approach in favor of the spawning of a new browser window.

Another approach to improving browsing and search capabilities is to replace and/or modify the user's browser program. Such approaches are often referred to as a "thick-client" solution because they require the user or client to download and run a program in addition to the user's browser program. Most web sites download content information formatted in a markup language that can be directly decoded by the user's browser program. This is referred to as "thin -client" because the only program that is required to decode the content information is the user's browser program.

Neoplanet.com is one example of a thick-client replacement browser program that integrates web browser, e-mail, chat, search engine and web directory into a single application. In order to run this program, a user must download a very large file from neoplanet.com and install that program in place of the user's browser program. Once installed, the thick-client replacement browser program provides the user with predetermined link connections that, for example, allow a user to select which of one a predetermined short list of search engines or shopping sites will be searched in response to search terms entered by the user.

X-Portal™ findware from centurionsoft.com is one example of a thick-client add-on program that adds functionality to a user's browser program, rather than replacing the browser program. After a user purchases and downloads the findware program file, the findware program adds a button on the control panel of the user's browser program that automatically initiates a search against a customized set of multiples search engines, and then dynamically combines, displays and reranks the results as response are returned from the multiple search engines. The search results can also be compared and filtered through a reference library maintained by X-Portal. Another example of a thick-client add-on program is the iware personal guide program from iwareinc.com. This add-on must be downloaded by the user, after which it creates an intuitive taskbar in the user's browser program. The intuitive taskbar includes, for example, a search feature that directs search terms entered by a user to preselected search engines and then combines the results of those searches when they return. Examples of add-on or plug-in programs for browsers are also described in U.S. Patent Nos. 5,710,918 and 6,041, 326. The concept of having content information from one source persist on an user's browser window instead of switching to display content information from a second source as part of an augmented browser control system and persist control system that are added to a user's conventional browser program are described in U.S. Patent No. 5,983,262.

Two of the challenges for the standard browser user interface that provides one page per window display of content information are the delay in loading multiple pages of content information and the difficulty in navigating through multiple pages of content information. Several solutions to delay problem have been suggested, such as deferred display of content information, browser-controlled complexity levels of content information and anticipatory caching of content information, which are described in U.S. Pat. Nos. 5,918,239, 5,987,466 and 6,016,520. Other solutions for the navigation problem have also been suggested, such as non-linear browsing, graphical node structures representing multiple pages of content information, combined index navigator, tree navigator and search term navigator as part of a single browser, and fast return to a search home page, which are described in U.S. Pat. Nos. 5,835,092, 5,877,766, 6,012,055 and 6,052,716.

An alternative approach to solving these problems has been to use side-by-side viewing or nesting of frames of content information. Examples of thick-client applications that have implemented this approach in the context of multi-media content information, grouping requests to multiple sites of content information at the same time, and formatting and displaying nested documents are described in U.S. Pat. Nos. 5,544,354, 6,012,090 and 6,031,989. A commercial application of side-by-side viewing of content information can be found in the Katiesoft™ web interface from katiesoft.com. The Katiesoft™ web interface partitions the user's screen into four quadrant windows and allows content information from up to four web sites to be simultaneously displayed in this side-by-side quadrant arrangement.

Recently, at least two thick-client replacement browser programs have provided a user interface with a feature referred to as browser tabs that allows these thick-client browser programs to display multiple frames of content information in a cascaded format within a single browser window. The Netcaptor™ program from netcaptor.com and the MultiWeb Viewer™ from multisource.com both utilize this tabbed feature to enable simultaneous submission and retrieval of content information from multiple sites. The Netcaptor™ program also provides for a common search term input area that allow a user to enter one set of search terms that are used to search multiple search engines simultaneously. The results of each search engine are returned to the Netcaptor™ program, which then formats those results to be displayed as multiple frames of content information in a cascaded format.

Although these thick-client replacement browser programs may offer a user better ways of viewing multiple sources of content information, the programs are limited due to the large downloads required to install them and the complications associated with supplanting the user's conventional browser program. In essence, these programs must be as compatible with downloading and displaying content information as the conventional browser programs, in addition to providing a different browser user interface. Because these programs are provided with predetermined choices of search engines and web sites, the choices afforded to the user may be limited and updating these choices involves the problems of downloading another update program. Perhaps most importantly, in contrast to conventional browser programs which are provided free of charge, these programs either cost money or require the user to agree to provide personal information that is used to generate customized advertisements which are displayed by the thick -client replacement browser program.

Another alternative for presenting browser information to user is the decision.control program from visualmining.com that provides a thin-client corporate decision portal. The portal includes a "dashboard like" view of multiple sources of content information that are typically maintained on a corporate intranet. The dashboard allows for categorization and searches of corporate information. The portal program is hosted in a corporate environment where the program operates on a dedicated corporate server and communicates with client computers within the computerized network of the company. Different sources of content information from the computerized network of the company may be displayed on the user's browser program simultaneously in multiple side-by-side frames within the browser window. Sources of content information outside the computerized network in the company are displayed in a conventional manner in the user's browser. The search feature on the dashboard of the portal is specialized to search content information inside the computerized network of the company and returns relevant information in a single window frame. The portal program executing on the server utilizes a split-server architecture having a session server for receiving request from clients and a query server that obtains results in response to these requests and passes them back through the session server to the client. This type of split-server architecture is described, for example, in U.S. Pat. No. 5,873,076. Although such a split-server architecture can be well suited for a corporate environment where security issues and the need for common access to private corporate data justify the additional expense of hosting a portal program on a dedicated server, this option is too expensive and complex for individual users.

While numerous solutions have been proposed, the challenge of providing a simple, yet efficient system for a networked thin-client browser to display content information from multiple sources still exists. Thick-client replacement browser programs and add-on programs can offer a user additional features; however, these features can be difficult to manage and maintain and are not consistent with the overall thin-client architecture of the Internet.

SUMMARY OF THE INVENTION

The present invention is a multi-level multiplexor system by which a networked browser client accesses content information over a networked computer system. The multi-level multiplexor system has at least one program executing on a server operably connected to the networked computer system that receives a service request from the networked browser client. In response, the program packages a reply that is returned to the networked browser client and causes that browser to automatically issue a plurality of service requests to sources of content information on the networked computer system. The packaged reply also causes the browser to present the responses to the plurality of service requests to sources of content information such that each response is selectively displayed as one of a cascaded series of pages of content information within a single window frame in the browser. In this way, the present invention is implemented as a thin-client solution with the advantages of minimizing network traffic while at the same time allowing for increased speed of access to multiple sources of content information. The multi-level multiplexor system afford the user a simple, yet efficient mechanism to access multiple sources of content information that retains the integrity of the content information without subjecting the user to the disadvantages of opening a new browser window for each new source of content information.

Preferably, the server is hosting a web site accessible on the Internet and the server program accesses at least one database operably connected to the server and encodes control and formatting information from the database into a markup language as part of the packaged reply. In contrast to existing thick-client replacement browser programs that must rely on predetermined control information such as the identity of a list of available sites to be accessed, this thin-client embodiment can easily update such control and formatting information from one access session to the next. This control and format information enables the browser to dynamically generate the presentation layer by which a user interacts with content information In this embodiment, the cascaded series of pages of content information are created as a layered series of iframes, with each iframe having a tab indicator that controls whether that iframe is to be displayed or hidden in the layered series. Each tab indicator preferably controls style sheet commands embedded in the markup language of the reply that effect the hiding or display of the desired layer of content information. Separate iframes are supported for display of navigation controls, searching parameter information, content information and advertisements.

The multi-level multiplexor system decreases the amount of client-server traffic across the network by allowing for a stateless environment to be maintained between the client and server which does not require a page refresh to be communicated between the client and server to create a change in state. This is accomplished by the control and formatting information encoded into the packaged reply which enables the browser to manage all of the multiple series of iframes according to a generic template. The system intelligently decides whether information is control and formatting information that should be encoded into the packaged reply or whether information is large enough or changes often enough that a page call between the client and server is the optimum way of handling this information.

DETAILED DESCRIPTION OF THE PREFERRED EMBODIMENT

A general familiarity with the operation of the Internet, browsers, markup languages and client-server communications is assumed. For background reference, a technical overview of how a client browser interfaces with a server across the Internet in the context of using multiple search engines is described in U.S. Pat. No. 5,873,080, which is incorporated by reference.

Figure 1:
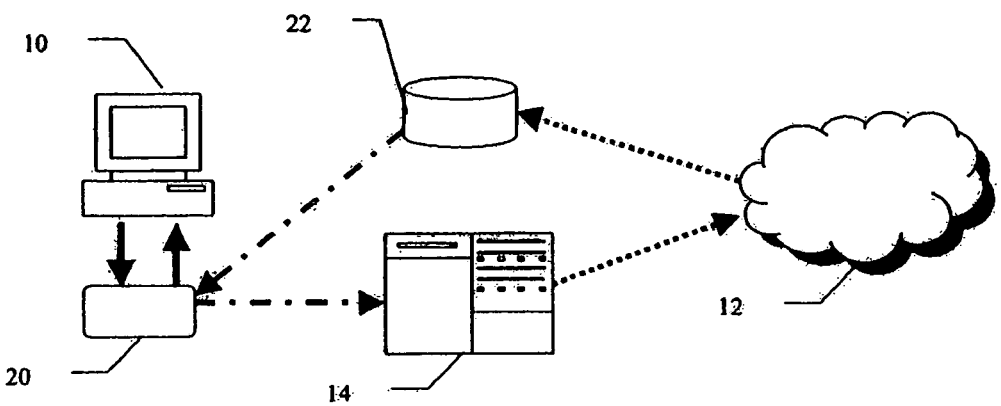
FIG. 1 is block diagram showing the operation of a prior art primary search engine.

Referring to FIG. 1, the operation of a prior art primary search engine will be described. A client computer 10 accesses a networked computer system 12, such as the Internet. (In the block diagrams, networked connections, either intranet or internet, are shown in dashed lines and internal connections are shown in solid lines). Typically, the Internet 12 is accessed by a networked browser program 20, such as Microsoft Internet Explorer™ or Netscape Navigator™ executing on the client computer 10. To initiate a search, the user enters search terms or keywords in an entry field on a web page for the web site associated with a search engine program. The search terms are collected by the browser program 20 and sent to the search engine program 14 executing on the server that is hosting the web site. The search engine program 14 parses the search terms and generates a search of content information on the Internet 12, either directly or via indexes and tables maintained by the search engine program 14. The results of this search by a single search engine (referred to as a primary search engine) are compiled in a database 22 that is made available to the browser 20 by sending a first page of links to content information identified in the search. For this kind of primary search engine 14, a single set of pages of links to content information generated by a single search engine is returned to the browser 20.

Figure 2:
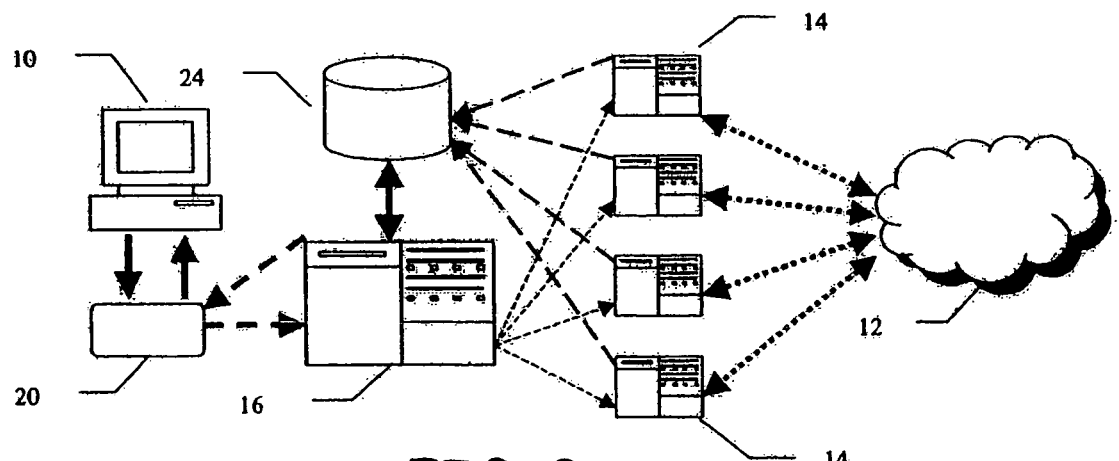
FIG. 2 is a block diagram showing the operation of a prior art meta search engine.

FIG. 2 shows the operation of a prior art meta search engine 16. Like the primary search engine 14 of FIG. 1, the meta search engine 16 of FIG. 2 is a program executing on a server connected to the Internet 12 that hosts a web site for the meta search engine 16. When a user enters search terms that are sent by the browser 20 to the meta search engine 16, the meta search engine parses the search terms and generates multiple new service requests that are sent to primary search engines 14. The results from each of these search requests are stored in a database 24 that is then accessed by the meta search engine 16 to filter and format the results and send a single set of pages of search results back to the browser 20; however, the links contained in those pages may have been identified by one or more primary search engines 14, rather than being directly identified by meta search engine 16.

Figure 3:
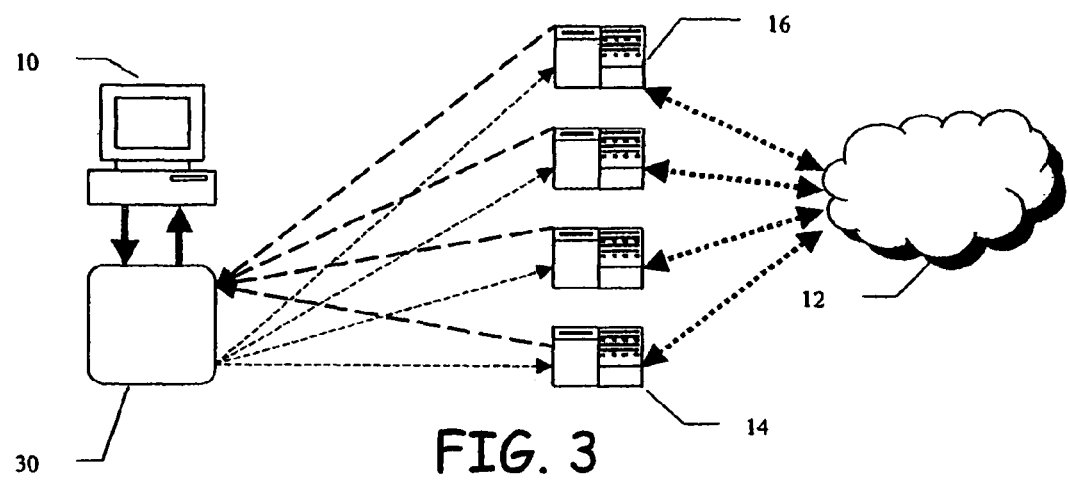
FIG. 3 is a block diagram showing the operation of a prior art thick client browser with a meta search feature.

FIG. 3 shows the operation of a prior art thick-client browser 30 with a meta search feature. Like the meta search engine 16 of FIG. 2, a thick-client browser 30 parses search terms entered by a user and generates multiple service requests that are sent to primary search engines 14, or even meta search engines 16 on the Internet. Unlike the meta search engine 16 of FIG. 2 which executes on a server separate from the client computer 10, the thick-client browser 30 is executing on the client computer 10. As such, the multiple service requests to the primary search engines 14 are returned directly to the client computer 10 and the thick-client browser 30 must be provided with sufficient functionality and resources to either filter and combine the results of these service request into a single display format or format and display the results of these service requests as multiple windows.

Figure 4:
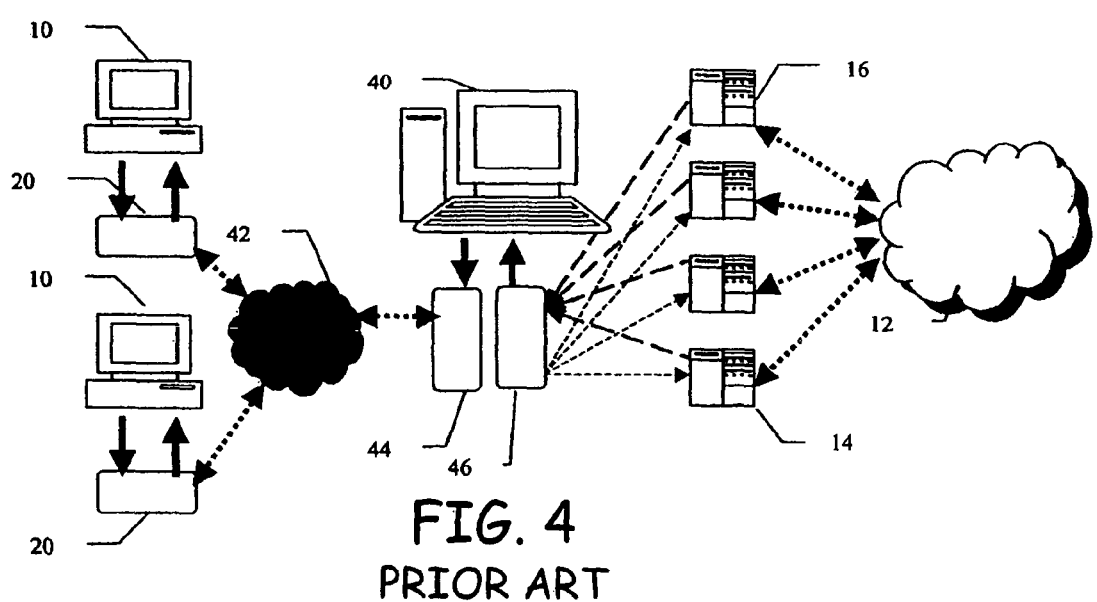
FIG. 4 is a block diagram showing the operation of a prior art dedicated server with a thin -client portal.

FIG. 4 shows the operation of a prior art thin-client browser 20 serviced by a dedicated server 40 that services a corporate intranet 42, for example. The dedicated server 40 could utilize a split server architecture where a request program 44 handles requests from multiple clients 10 attached to the intranet 42 by conventional thin-client browsers 20. At least one service program 46 interfaces with the request program 44 to service the various requests from the browsers 20 by performing a desired function and returning the results to the request program 44, which in turn directs those results to the appropriate client 10 which made the original service request. In many ways, the functionality of the meta search facility of the thick-client browser 30 of FIG. 3 are emulated by one of the service programs 46. The service program 46 parses search terms entered by a user and may initiate multiple search requests to primary search engines 14 and meta search engines 16. The responses to these requests are then filtered and combined, perhaps with other data available only on the intranet 42, and the results are passed back through the request program 44 to the appropriate client 10.

Figure 5:
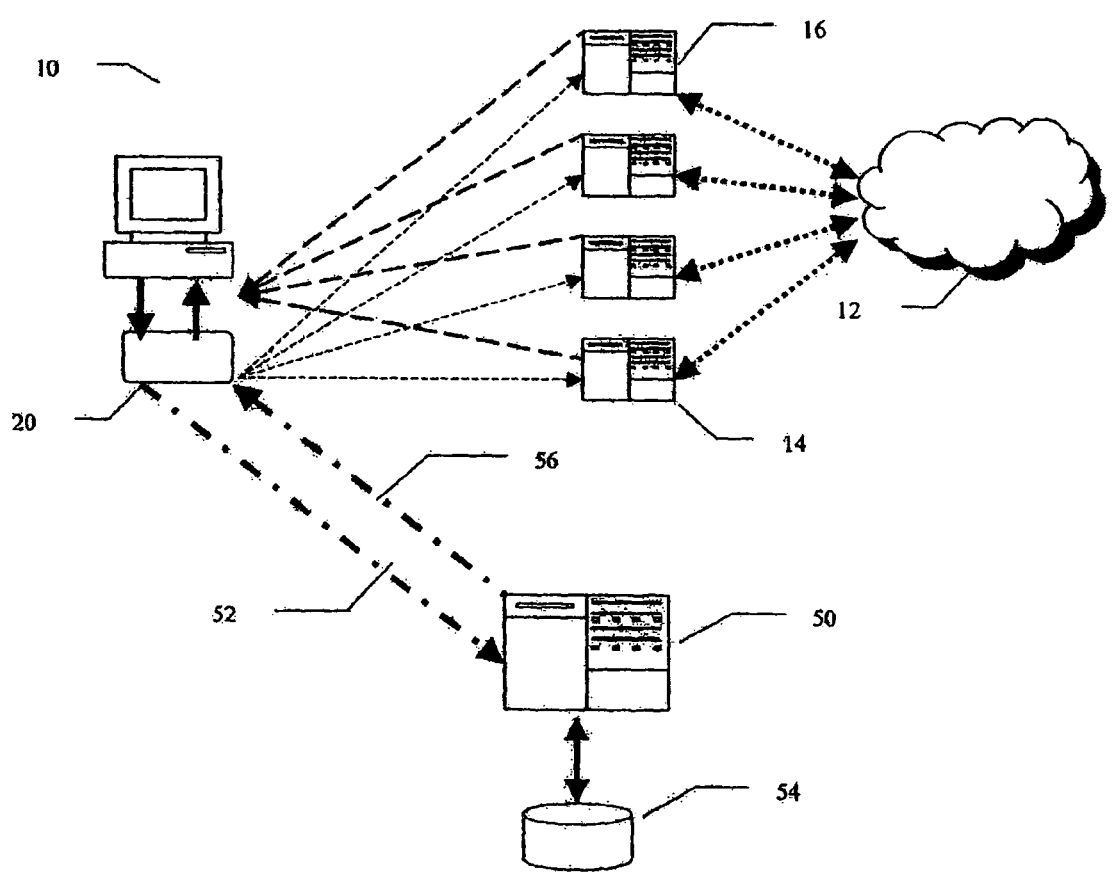
FIG. 5 is a block diagram showing the operation of a search function of the multi-level multiplexor system of the present invention.

Referring now to FIG. 5, the operation of a search function of the multi-level multiplexor system 50 of the present invention will be described. A conventional thin-client browser 20 executes on the client computer 10 and is connected to the Internet 12. It will be understood that the present invention can also execute on an intranet system, and through various Internet or intranet protocols. Additionally, while the preferred embodiment is generally described in terms of hard-wired communication, it will be understood that such communication could just as easily take place over a wireless communication network. With such wireless communications, for example, a wireless handheld client browser 20 would communicate with the server without a direct hard-wired connection to that server.

When the browser program 20 accesses the web site hosted by a server executing the multi-level multiplexor system 50, a request 52, in this case a search request, is communicated to the system 50. At least one program of the system 50 services the request 52 by accessing a database 54 containing control and formatting information to encode necessary control and formatting information into a markup language as part of a packaged reply 56. The request can be serviced by the server, or the server can, after a dynamic and intelligent evaluation of the specific request needs, delegate the request to another server and its corresponding database on the network. Although it is possible that no database 54 would be needed if information were hard-coded into the programs, the preferred embodiment of the present invention utilizes at least one database 54 such that updating control and formatting information can be easily managed and implemented. This control and format information enables the browser 20 to dynamically generate the presentation layer by which a user interacts with content information. The system 50 intelligently decides whether information is control and formatting information that should be encoded into the packaged reply or whether information is large enough or changes often enough (i.e., changes more often than from one session with the web site to the next) that a page call between the client and server is the optimum way of handling this information.

Once the browser 20 has received the packaged reply 56, the browser automatically issues a plurality of service requests, which in the case of a search are to search engines 14 and meta search engines 16. The packaged reply 56 also causes the browser 20 to present the responses to the plurality of service requests to the search engines 14 and meta search engines 16 such that each response is selectively displayed as one of a cascaded series of pages of content information within a single window frame in the browser 20. In this way, the present invention is implemented as a thin-client solution with the advantages of minimizing network traffic while at the same time allow for increased speed of access to multiple sources of content information. The multi-level multiplexor system affords the user a simple, yet efficient mechanism to access to multiple sources of content information on the Internet 20 that retains the integrity of the content information without subjecting the user to the disadvantages of opening a new browser window for each new source of content information. Additionally, the use of a thin-client browser 20 significantly reduces the file size of the packaged reply 56 in comparison to the size of files transferred within a conventional thick-client system. Generally, the packaged reply in the present invention is no greater than 10 kilobytes, and usually falls within the 1 to 2 kilobyte range. This reduced file size results in increased speed and efficiency system wide.

Figure 6:
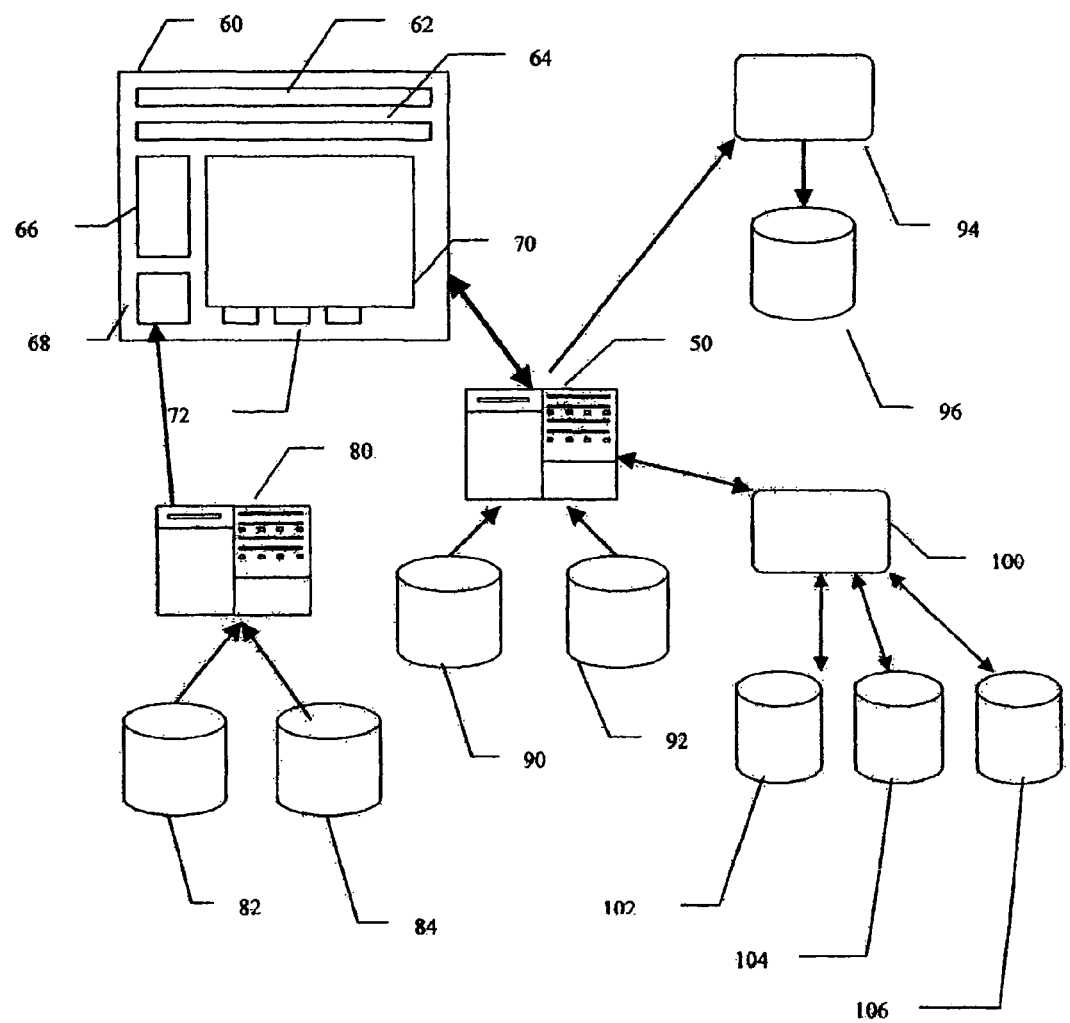
FIG. 6 is an overall block diagram of some of the programs and databases of a preferred embodiment of the multi-level multiplexor system as shown in FIG. 5.

Referring now to FIG. 6, an overall functional block diagram of the programs and databases of a preferred embodiment of the multi-level multiplexor system 50 is shown. A user interface screen 60 display the user interface as created by the presentation layer of a conventional browser 20 on a screen at the client computer 10 in response to a packaged reply 56. The screen 60 can include a conventional navigation bar 62 as generated by the browser 20, which preferably has certain features masked to direct the user to a second navigational bar 64 that is preferably presented as an iframe and routes navigational commands back to the system 50. An index bar 66 as shown along the left-hand side of the screen 60 can be displayed, as shown for example in FIG. 7, or hidden, as shown for example in FIG. 8. A rotator ad window 68 is preferably located in the lower left-hand corner of screen 60. Display of content information in the main content display area 70 is controlled by which of a series of tab indicators 72 is selected.

In the preferred embodiment, the cascaded series of pages of content information are created as a layered series of iframes to be displayed in display area 70, with each iframe having a tab indicator 72 that controls whether that iframe is to be displayed or hidden in the layered series. Each tab indicator 72 preferably controls style sheet commands embedded in the markup language of the reply 56 that effect the hiding or display of the desired layer of content information. Separate iframes are supported for display of navigation controls 64, searching parameter information 66, content information 70 and advertisements 68. In addition to the displayed iframes, hidden iframes may be created in order to spawn requests which will cause the client browser 20 to perform designated functions such as, but not limited to, the running of Adobe Acrobat™ and MSWord™ files. In addition to displaying HTML content information, the preferred embodiment can display content information in a variety of other formats such as OS.

The multi-level multiplexor system 50 decreases the amount of client-server traffic across the network by allowing for a stateless environment to be maintained between the client and server which does not require a page refresh to be communicated between the client and server to create a change in state. This is accomplished by the control and formatting information encoded into the packaged reply 56 which enables the browser 20 to manage all of the multiple series of iframes according to a generic template.

In the preferred embodiment, advertisements are displayed in the rotator ad window 68 from an ad server 80 separate from the server executing the remaining portion of the system 50. Preferably, the ad server 80 can access a default ad database 82 or a customized or personalized ad database 84.

Figure 7:
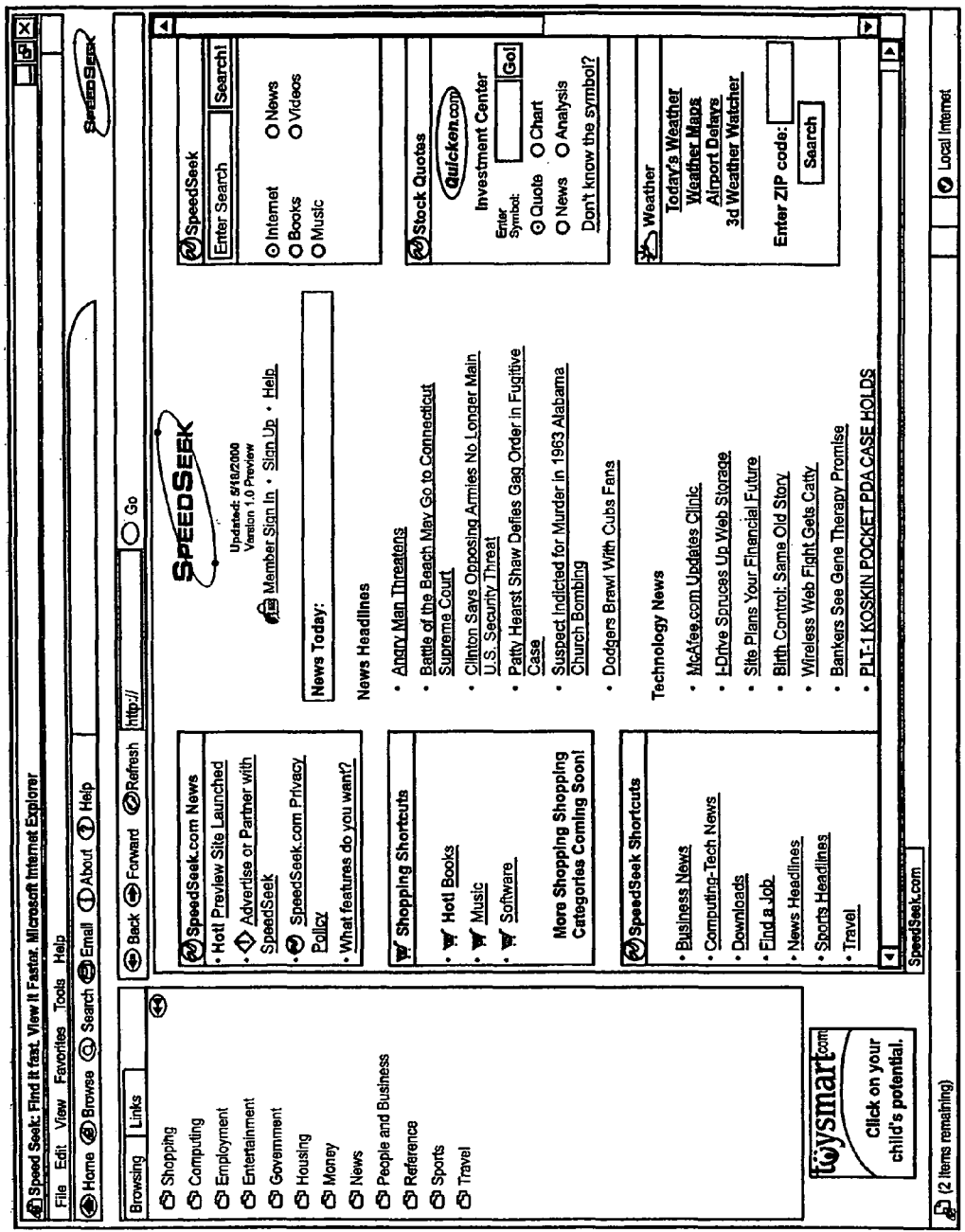
FIGS. 7 to 14 are screen shots of various screens displayed by a thin-client networked client browser in response to the multi-level multiplexor system as shown in FIG. 5.
Figure 8:
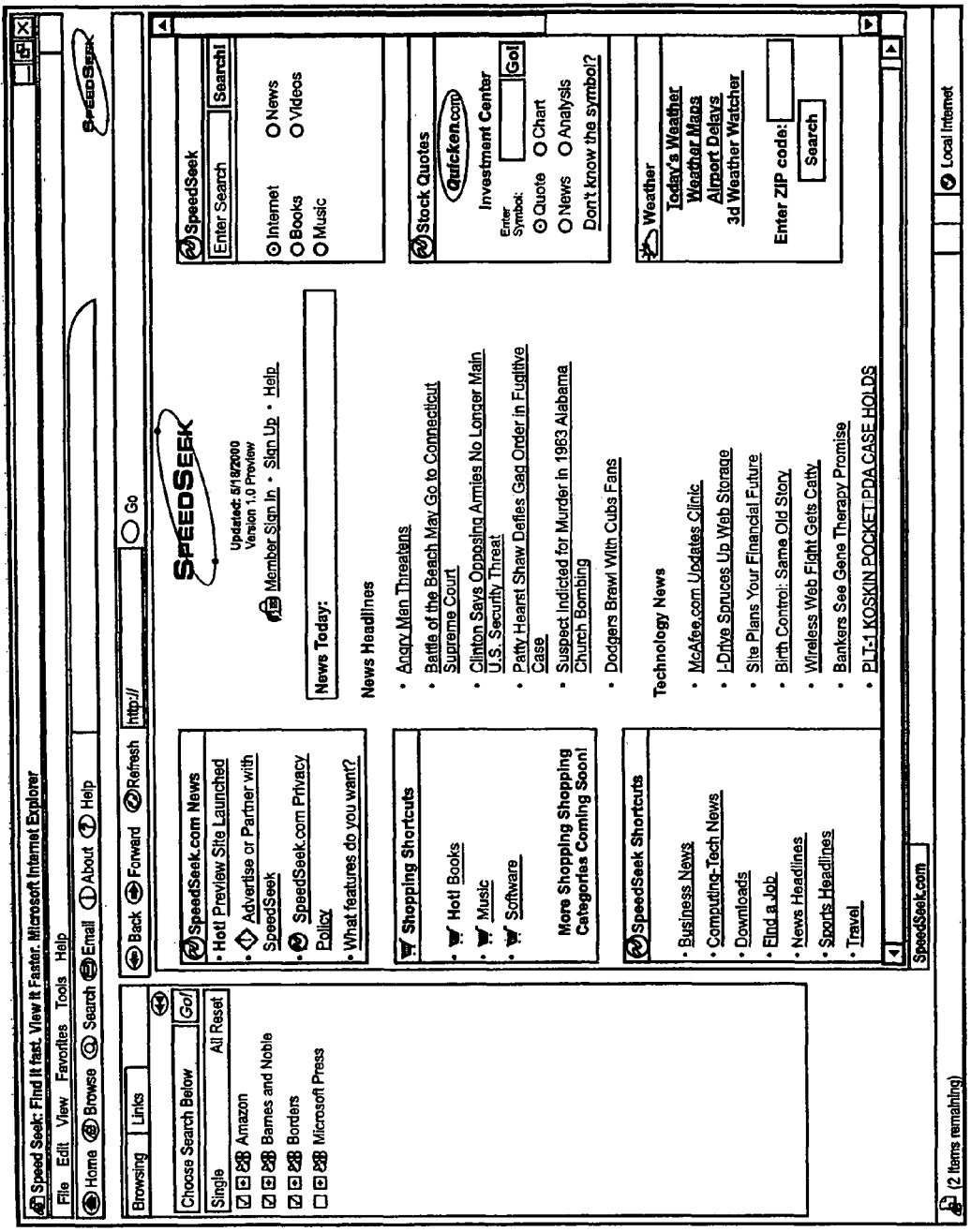

The preferred embodiment of the multi-level multiplexor system 50 includes a default main page, the content for which is stored or linked at database 90. An example of this main page is shown in FIGS. 7 and 8. Another database 92 stores the control and formatting information used by the system 50 to generate the session-constant information such as sites in the index window. Preferably, a pair of active server pages (ASPs) 94 and 100. ASP 94 is used to generate an item list that forms the generic template for the iframes based on an associated database 96. ASP 100 is used to generate a new multiplier return list that controls the packages of the reply 56 for the tabbed series of cascaded pages of content information that will be returned to the browser 20. This new multiplier return list is based on an information in an associated database 102.

ASP 100 additionally serves to generate display formatting information for the packaged reply 56 that effects the visual display on the client display screen 60. As previously mentioned, the multi-level multiplexor system 50 can exist over a wireless network system as well as a conventional hard-wired network. Those skilled in the art will understand the formatting limitations of a wireless display. In addition, the client browser display requirements can vary greatly, in a hard-wired or wireless environment, depending on browser requirements. In response to these wireless display limitations and any unique browser display needs, ASP 100 is used to generate display formatting information that will be returned to the client browser, whether the client is connected via hard-wired connection or wireless communication. Database 104 stores browser type display formatting information (BT), while database 106 stores display return type formatting information for wireless displays (RT). The appropriate display information is included in the packaged reply 56 to the client, thus providing the appropriate viewing commands for those client systems comprising nonstandard displays or unique browser demands.

Figure 9:
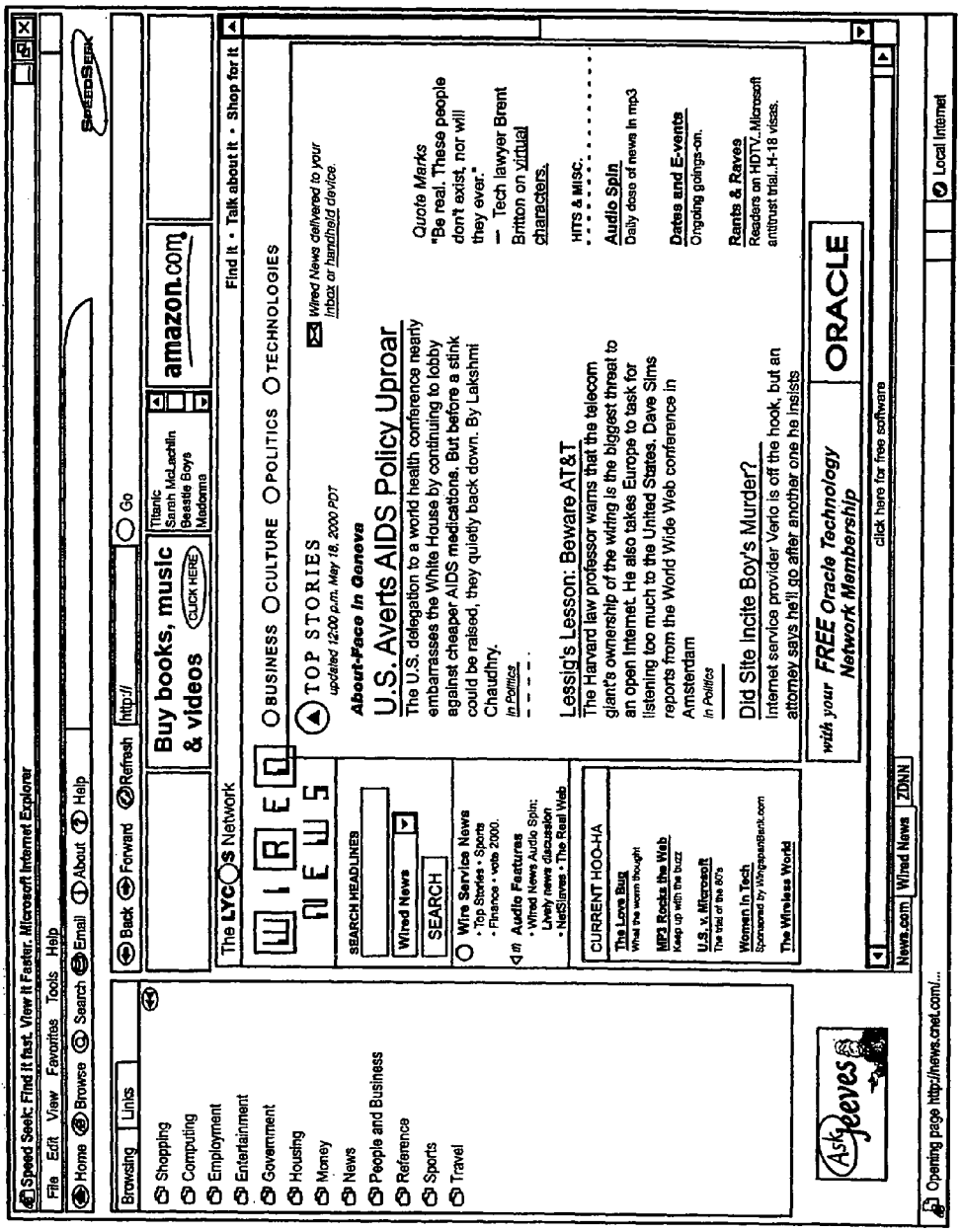

FIG. 9 shows a screen shot of a cascaded series of iframes of content information produced by a user selecting the Computing-Tech News link as shown in the main page of FIG. 7. It can be seen that the middle tab indicator 72 is highlighted in a three-dimensional manner to indicate the source of the content information that is at the front of the cascaded series of iframes.

Figure 10:
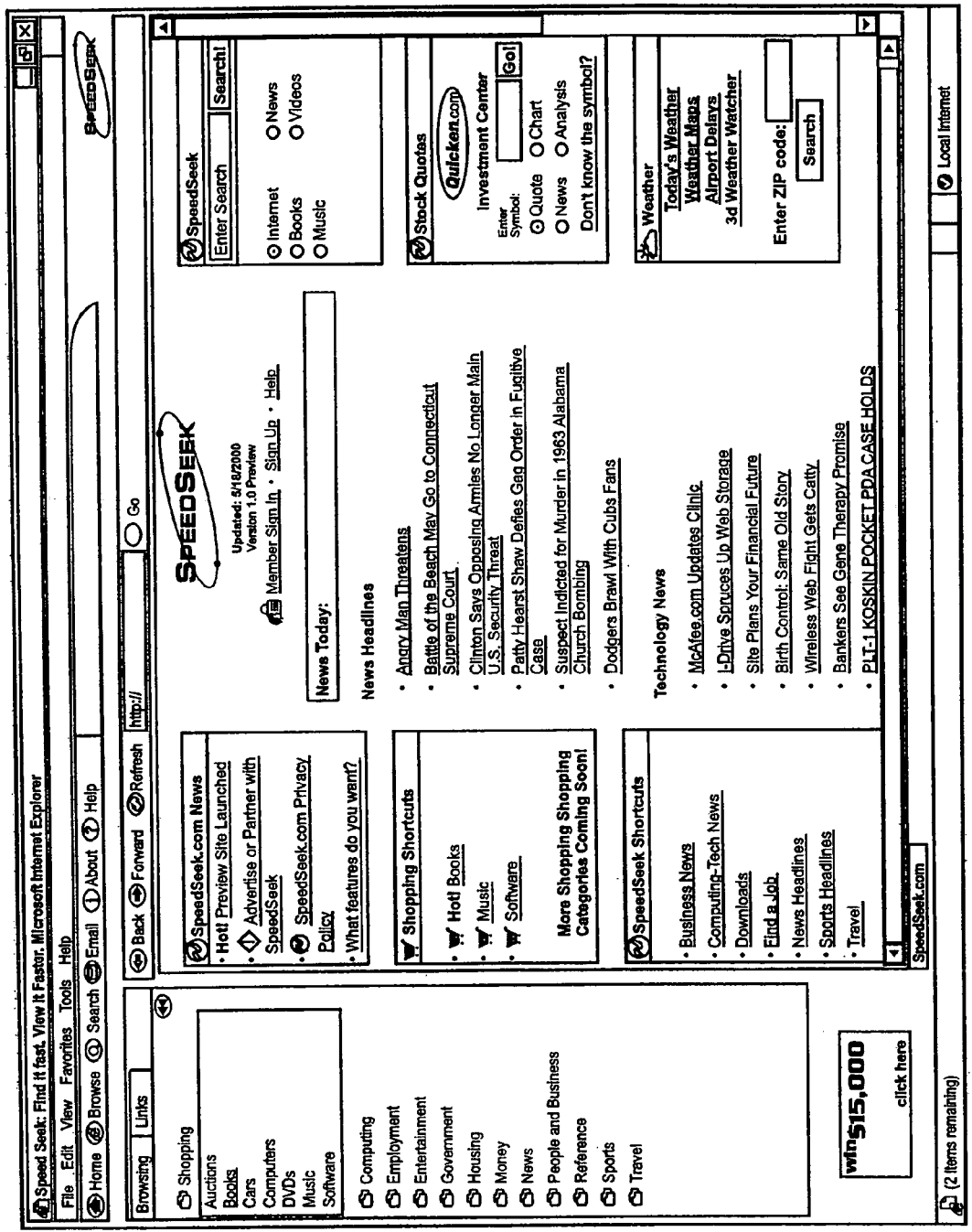
Figure 11:
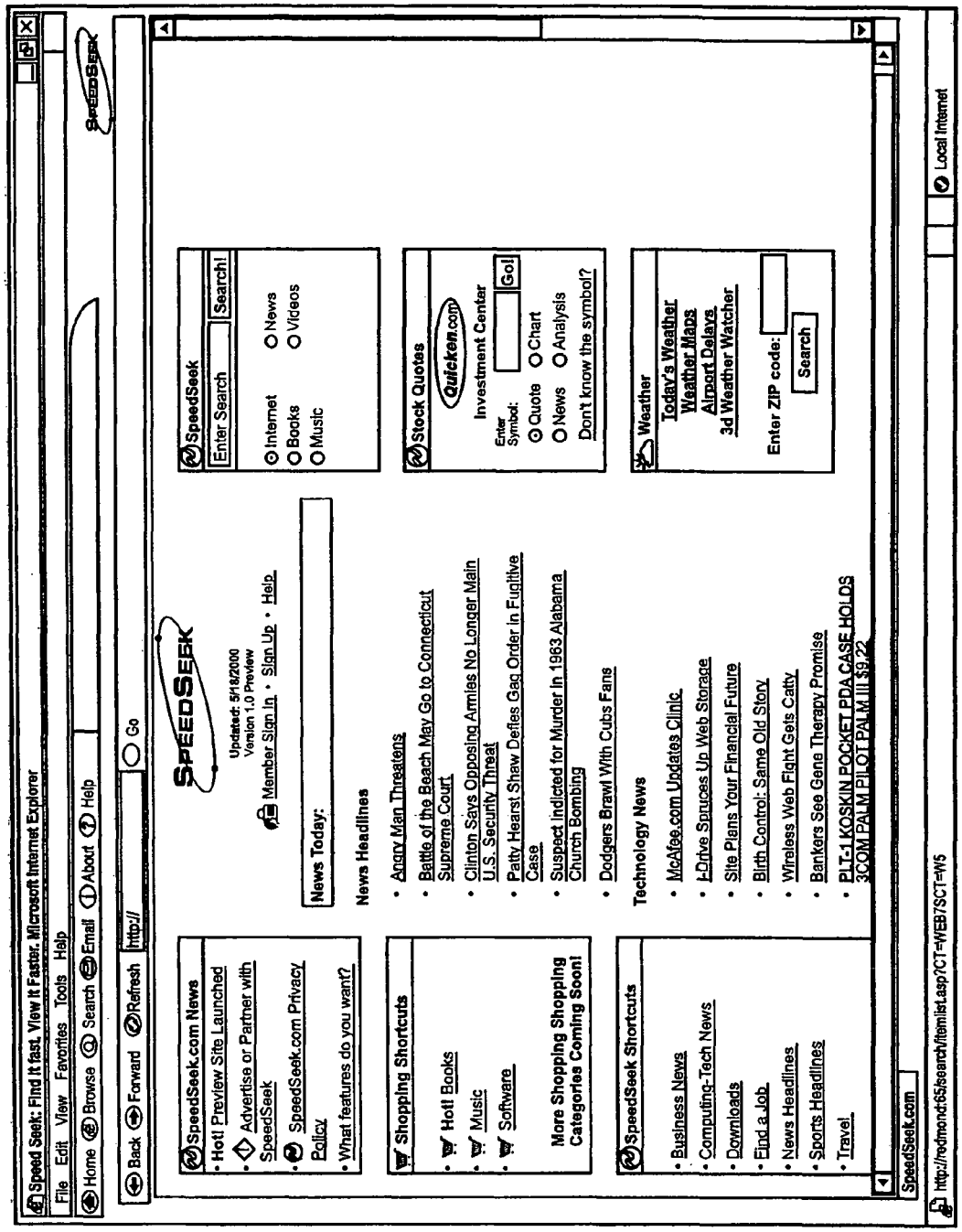
Figure 12:
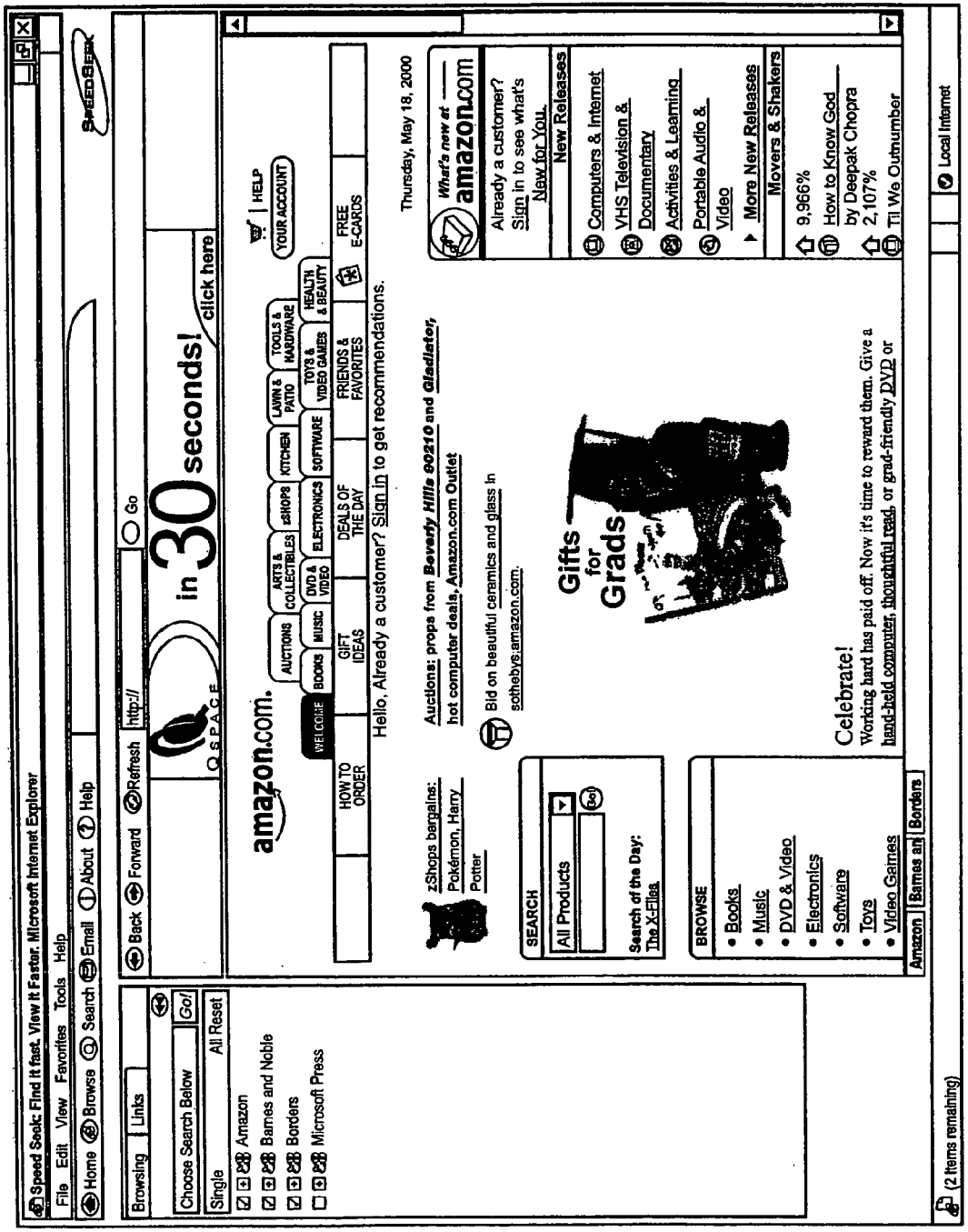

FIGS. 10, 11 and 12 show a sequence of screen shots of how a shopping index in the index bar 66 accesses multiple sources of shopping-related content information. It can be seen that a user has the option at FIG. 11 of indicating which of the sources of content information under this entry in the index bar are to be obtained. As shown in FIG. 12, the entire response from the source of the content information is displayed in display area 70 with no editing or even temporary copying by the system 50. The information is requested and returned directly to the browser 20 of the user.

Figure 13:
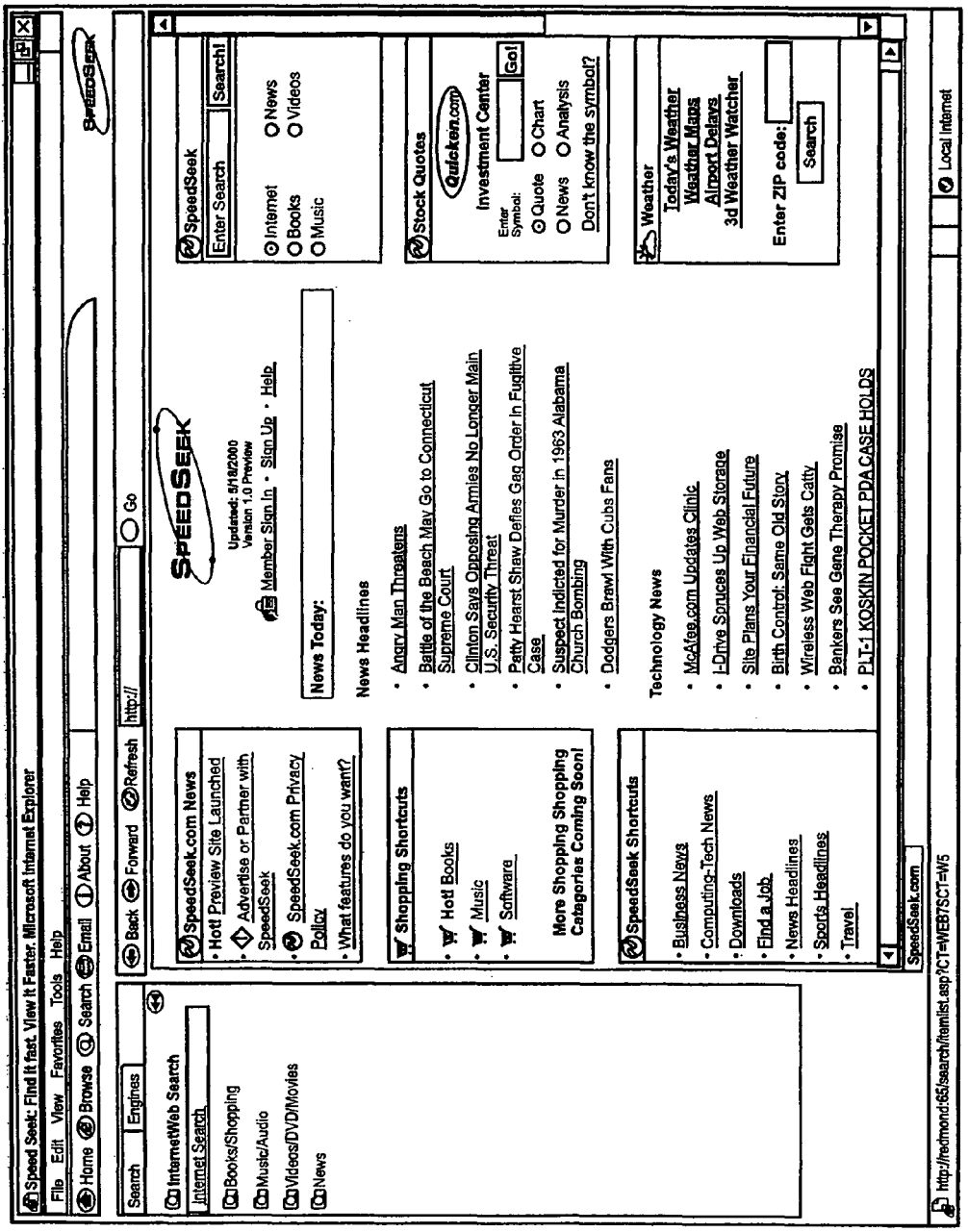
Figure 14:
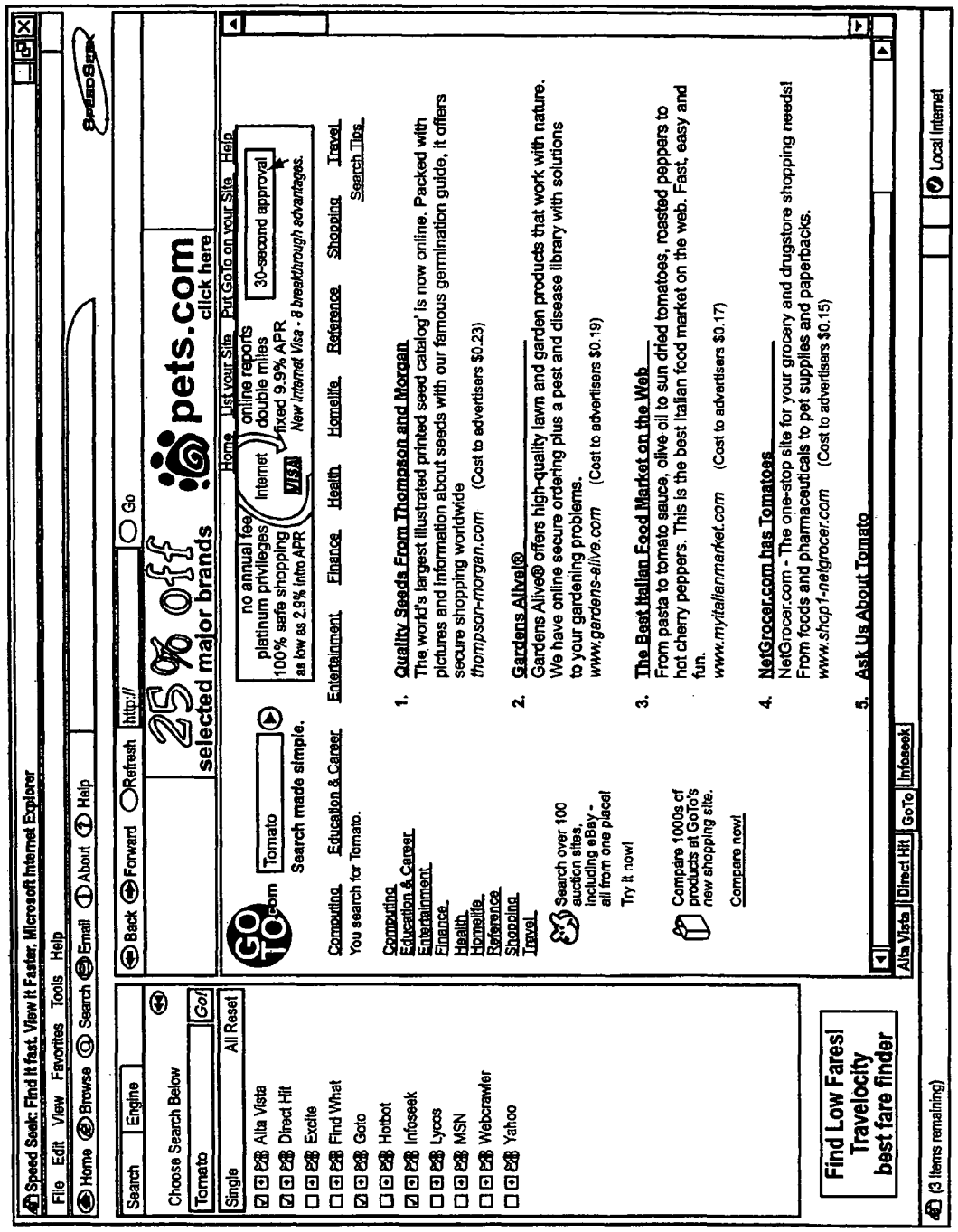

FIGS. 13 and 14 show a sequence of screen shots of how a search in the index bar accesses multiple sources of search-related content information. In this feature, another ASP (not shown) in the system 50 parses the search terms as entered in the Go window and then reformats those terms in the manner required for each of the search engines designated by the user in order to automatically initiate the desired search to that search engine.

Figure 15:
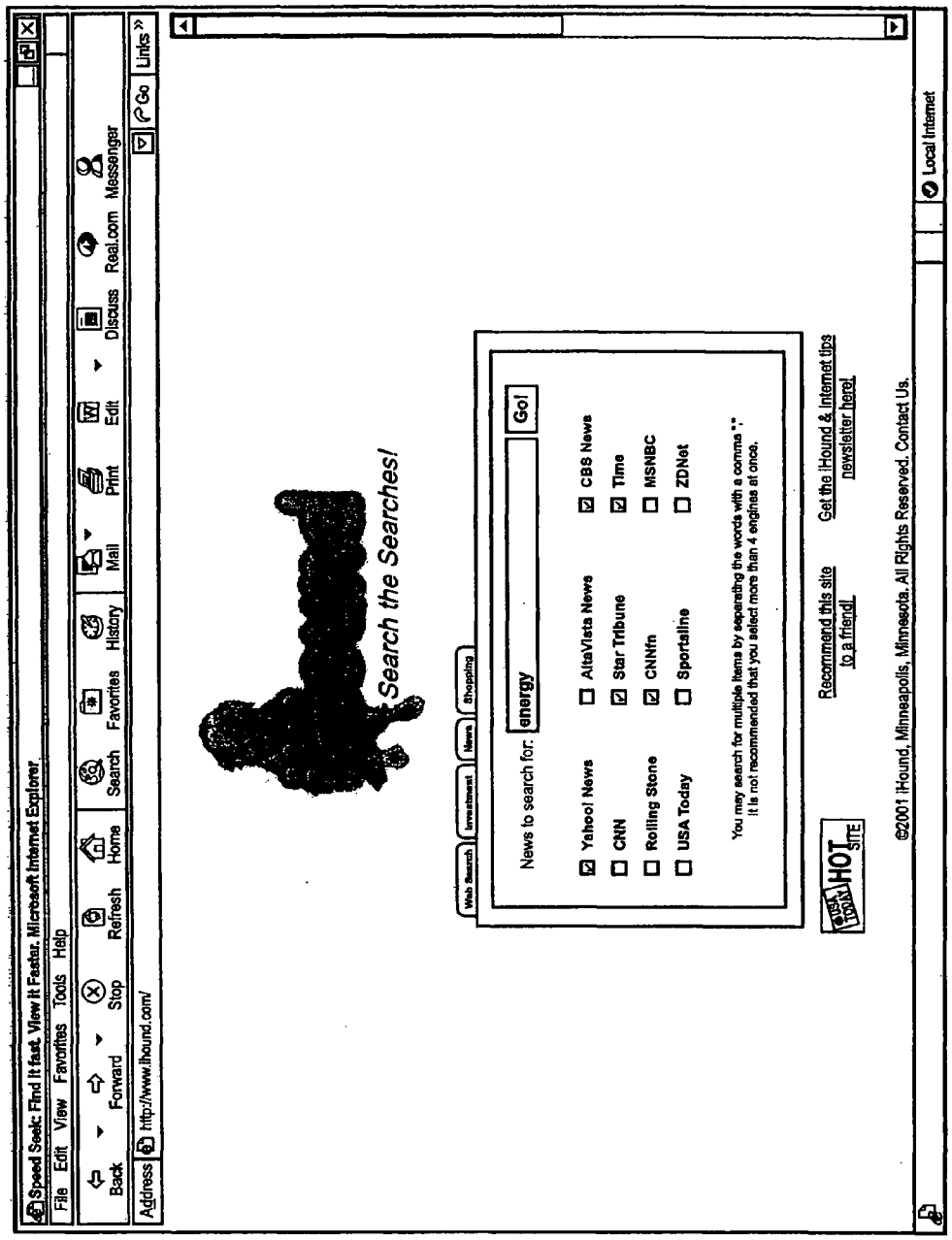
FIGS. 15 to 16 are screen shots of an alternative embodiment by a thin-client networked client browser utilized at ihound.com in response to the multi-level multiplexor system of the present invention.
Figure 16:
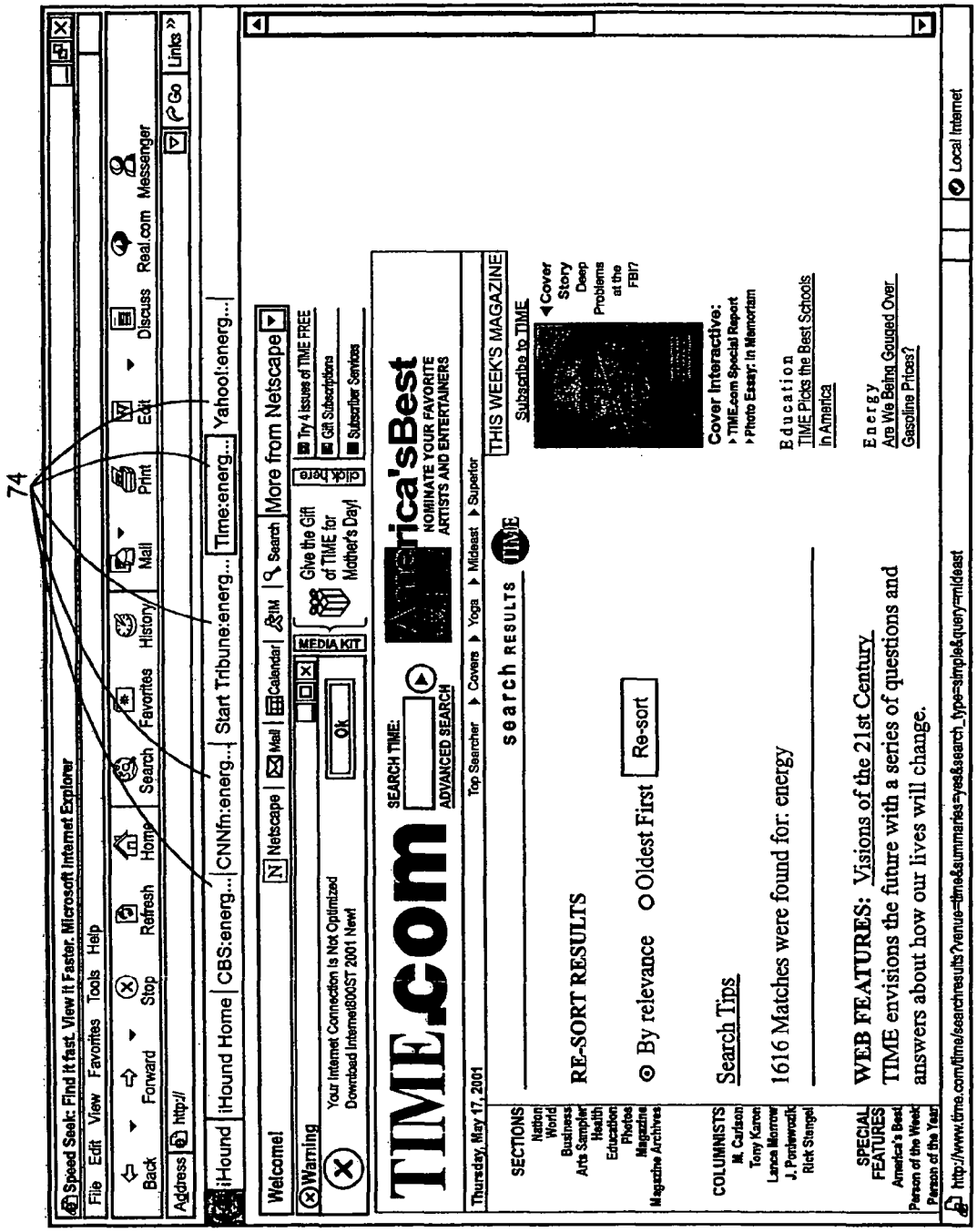

FIGS. 15 and 16 show a sequence of screen shots of an alternative embodiment. Specifically, in this embodiment, an initial set of tab indicators 74 present various search categories (e.g., web search, investment, news, shopping, etc.). These tab indicators 74 are presented in a three-dimensional manner. When one of the tabbed search categories is chosen, a selectable list is made available, listing a defined but server-modifiable selection of specific content information sources. Content information sources can be added or subtracted depending on the availability of formatting and control information within the server's databases, or server-accessible databases. A user is able to selectively determine which content information sources within the search category will be searched for specific search terms. In this alternative embodiment, the cascaded series of pages of content information returned in the packaged reply are displayed as a layered series of iframes to be displayed on the top portion of the display area 70. This alternative embodiment does not display the left side index bar 66 or the rotator ad window.

It is contemplated that the program code for the multi-level multiplexor system 50 may be licensable to sublicenses for use on local network or intranet. Through this licensing, especially under an intranet environment, the licensee may be permitted to make various aesthetic and functional adjustments depending on the licensee's individual needs and preferences. For example, changes can be made to the packaged reply that will cause the browser to alter the conventional display and use of the iframes so as to customize the multi-level multiplexor for a given licensee or application.

For a detailed description of an implementation of the preferred embodiment of the present invention, reference is made to the markup language listings attached as Attachment A and the source code listing for the programs for the multi-level multiplexor system 50 attached as Attachment B.

A portion of the disclosure of this invention is subject to copyright protection. The copyright owner permits the facsimile reproduction of the disclosure of this invention as it appears in the Patent and Trademark Office files or records, but otherwise reserves all copyright rights.

Although the preferred embodiment of the automated system of the present invention has been described, it will be recognized that numerous changes and variations can be made and that the scope of the present invention is to be defined by the claims.

It should be understood that any of the embodiments described herein may be implemented as computer-readable instructions stored on a tangible computer-readable medium. Upon execution by a processor, the computer-readable instructions can cause a computing device to perform operations to implement any of the embodiments described herein.

The invention claimed is:

1. A multi-level multiplexor system comprising:
a server operably coupled to a network computer system, wherein the server is configured to:
receive a first service request from a browser; and
send a packaged reply in a markup language to the browser, wherein the packaged reply is configured to:
cause the browser to issue a plurality of search requests to a plurality of sources of content on the network computer system; and
cause the browser to display responses to the plurality of search requests as a series of pages of content within a single window frame of the browser, wherein the series of pages includes a series of markup language elements, and wherein at least one of the markup language elements includes a selection indicator configured to selectively display the markup language element within the single window frame.

2. The system of claim 1, wherein the server is coupled to a database; and wherein the server is configured to:
receive information from the database; and
encode the information in the markup language as part of the packaged reply.

3. The system of claim 1, wherein the network computer system comprises at least an Internet, an Intranet, or a browser client accessible network, and wherein the server hosts a website accessible over the network computer system.

4. The system of claim 1, wherein the selection indicator controls style sheet, layout, or operative commands embedded in the markup language of the reply.

5. The system of claim 1, wherein the markup language is an extensible markup language (XML), and wherein the markup language elements are one or more of an iframe, an object, a div, or a span.

6. The system of claim 1, wherein the pages of content are layered within the single window frame of the browser.

7. The system of claim 1, wherein the markup language elements are configured to display navigation controls, searching parameter information, or advertisements.

8. The system of claim 1, wherein the packaged reply is based at least in part on an active server page.

9. The system of claim 8, wherein the active server page is used to generate a generic template for one of the markup language elements or to generate display formatting information for the packaged reply.

10. A method for accessing content over a network, the method comprising:
sending a first service request from a network browser to a network server;
receiving a packaged reply at the network browser from the network server;
issuing a plurality of search requests from the network browser to a plurality of sources of content information on a network computer system in response to the packaged reply:
receiving responses including content information corresponding to the plurality of search requests at the network browser; and
displaying the content information as a series of pages of content within a single window frame of the network browser, wherein the series of pages includes a series of markup language elements, and wherein the markup language elements are selectively displayed.

11. The method of claim 10, wherein the displaying the content information comprises displaying the content information as a series of layers, and wherein the markup language elements include a plurality of selection indicators configured to selectively effect the hiding, layout, or display of a layer of content information by controlling commands embedded in a markup language of the packaged reply.

12. A method for accessing content over a network, the method comprising:
receiving a first service request from a network browser at a network server;
sending a packaged reply to the network browser from the network server, wherein the packaged reply is configured to cause the network browser to:
issue a plurality of search requests from the network browser to sources of content information on a network computer system in response to the packaged reply;
receive responses including content information corresponding to the plurality of search requests at the network browser; and
display the content information corresponding to the plurality of search requests as a series of pages of content within a single window frame of the network browser, wherein the series of pages comprises a series of markup language elements, and wherein the markup language elements are selectively displayed.

13. The method of claim 12, wherein the displaying the content information comprises displaying the content information as a series of layers, and wherein the markup language elements include a plurality of selection indicators configured to selectively effect the hiding, layout, or display of a layer of content information by controlling commands embedded in a markup language of the packaged reply.

14. A tangible computer-readable medium having computer-readable instructions stored thereon, comprising:
instructions to cause sending a first service request from a browser to a network server;
instructions to cause receiving a packaged reply in a markup language from the network server;
instructions to cause issuing a plurality of search requests to sources of content information on a network computer system in response to the packaged reply;
instructions to cause receiving responses including content information corresponding to the plurality of search requests; and
instructions to cause displaying the content information corresponding to the plurality of search requests as a series of pages of content within a single window frame of a network browser, wherein the series of pages includes a series of markup language elements, and wherein the markup language elements are selectively displayed.

15. The tangible computer-readable medium of claim 14, wherein the network computer system comprises at least an Internet, an Intranet, or a browser client accessible network; and further comprising instructions to cause accessing a website hosted by the server over the network computer system.

16. The tangible computer-readable medium of claim 14, wherein at least one of the markup language elements includes a selection indicator configured to selectively display the markup, language elements, and wherein the selection indicator controls style sheet, layout, or operative commands embedded in the markup language of the reply.

17. The tangible computer-readable medium of claim 14, wherein the packaged reply includes control and formatting information obtained from a database, and wherein the control and formatting information is encoded into the markup language at the server.

18. The tangible computer-readable medium of claim 14, wherein the markup language is an extensible markup language (XML), and wherein the markup language elements are one or more of an iframe, an object, a div, or a span.

19. The tangible computer-readable medium of claim 14, further comprising instructions to cause dynamically generating a presentation layer based on control and formatting information of the packaged reply.

20. The tangible computer-readable medium of claim 14, wherein the pages of content are layered within the single window frame of the browser.

21. The tangible computer-readable medium of claim 14, wherein the markup language elements are configured to display navigation controls, searching parameter information, or advertisements.

22. The tangible computer-readable medium of claim 14, wherein the packaged reply is based at least in part on an active server page.

23. The tangible computer-readable medium of claim 22, wherein the active server page is used to generate a generic template for one of the markup language elements or to generate display formatting information for the packaged reply.

24. A tangible computer-readable medium having computer-readable instructions stored thereon, comprising:
- instructions to cause receiving a first service request from a network browser;
- instructions to cause packaging a reply, wherein the packaged reply is configured to cause the network browser to:
  - issue a plurality of search requests from the network browser to sources of content information on a network computer system in response to the packaged reply;
  - receive responses including content information corresponding to the plurality of search requests at the network browser; and
  - display the content information corresponding to the plurality of search requests as a series of pages of content within a single window frame of the network browser, wherein the series of pages comprises a series of markup language elements, and wherein the markup language elements are selectively displayed; and
- instructions to cause sending the packaged reply to the network browser.

* * * * *